United States Patent
Jannetta et al.

(10) Patent No.: US 6,568,172 B2
(45) Date of Patent: May 27, 2003

(54) CONVERGING NOZZLE THRUST REVERSER

(75) Inventors: Thomas J. Jannetta, Bixby, OK (US); Frederick H. Peters, Tulsa, OK (US)

(73) Assignee: The Nordam Group, Inc., Tulsa, OK (US)

(*) Notice: Subject to any disclaimer, the term of this patent is extended or adjusted under 35 U.S.C. 154(b) by 0 days.

(21) Appl. No.: 09/965,194

(22) Filed: Sep. 27, 2001

(65) Prior Publication Data

US 2003/0056493 A1 Mar. 27, 2003

(51) Int. Cl.[7] .............................................. F02K 3/02
(52) U.S. Cl. .............. 60/226.2; 244/110 B; 239/265.31
(58) Field of Search ..................... 60/226.2; 244/110 B; 239/265.31

(56) References Cited

U.S. PATENT DOCUMENTS

| 4,147,028 A | 4/1979 | Rodgers |
| 4,232,516 A | 11/1980 | Lewis et al. |
| 4,502,638 A * | 3/1985 | Szuminski et al. ..... 239/265.29 |
| 5,054,285 A | 10/1991 | Geidel et al. |
| 5,228,641 A | 7/1993 | Remlaoui |
| 5,655,360 A | 8/1997 | Butler |
| 5,794,434 A | 8/1998 | Szupkay |
| 5,806,302 A | 9/1998 | Cariola et al. |
| 5,904,320 A * | 5/1999 | Tindell .................... 244/110 B |

* cited by examiner

Primary Examiner—Ehud Gartenberg
(74) Attorney, Agent, or Firm—Francis L. Conte

(57) ABSTRACT

A thrust reverser includes axially adjoining forward and aft cowls defining a fan nacelle for surrounding a fan and core engine with a fan duct therebetween. The aft cowl has a forward face and the forward cowl has an aft face adjoining each other to define a reverser nozzle which converges radially outwardly. The aft cowl is translatable between a stowed position in which the reverser nozzle is closed and a deployed position in which the reverser nozzle is open for discharging fan air in a forward direction for thrust reversal.

20 Claims, 3 Drawing Sheets

CONVERGING NOZZLE THRUST REVERSER

BACKGROUND OF THE INVENTION

The present invention relates generally to aircraft gas turbine engines, and, more specifically, to a high bypass turbofan engine having a fan thrust reverser.

Turbofan gas turbine engines are commonly used for powering aircraft in flight. The turbofan engine includes a core engine surrounded by a core cowl, and is configured for powering a fan disposed upstream therefrom. A nacelle surrounds the fan and the forward portion of the core engine and is spaced therefrom to define an annular fan or bypass duct. The nacelle has a fan inlet at a forward end and a fan outlet or nozzle at an aft end defined around the core cowl.

A fan thrust reverser is commonly disposed in the aft section of the fan nacelle and is used for reversing thrust upon landing of the aircraft to enhance its stopping capability. The fan thrust reverser is typically mounted between an axially translatable aft cowl portion of the nacelle and a stationary forward cowl portion thereof.

A plurality of thrust reversing deflector doors are typically mounted around the inner perimeter of the aft cowl and are deployed to block the fan duct as the aft cowl is deployed aft. Suitable linear actuators are used to translate the aft cowl between its stowed or retracted position and its deployed or extended position which uncovers a substantially annular outlet for reversing thrust.

The thrust reverser outlet is defined between the forward and aft cowls and typically includes therein a conventional cascade of turning vanes. The cascade vanes are arranged in axial rows and are circumferentially divided into a multitude of cells or small passages through which the fan air is directed radially outwardly by the deflector doors during thrust reversal operation.

Since the nominal direction of the fan air channelled through the fan duct is axially aft, the cascade turning vanes are configured with an upstream directed inclination for turning and reversing the direction of the fan air as it is discharged through the reverser outlet during thrust reverse operation.

The cascade vanes may be straight or arcuate in axial section with constant area flow passages defined therebetween. Since the cascade vanes define a multitude of the flow passages or cells in the reverser outlet, the vanes themselves inherently occupy area in the reverser outlet and decrease the effective flow area thereof.

Accordingly, the reverser outlet must be correspondingly sized larger in area to offset the loss of area introduced by the cascade vanes themselves. This in turn requires an increase in the axial throw or translation aft of the aft cowl during thrust reverse operation. And, the overall weight of the nacelle is correspondingly increased by the introduction of the cascade turning vanes, by the additional nacelle length required for reverser throw, and by the associated components required for actuation thereof.

Furthermore, the aerodynamic efficiency of the cascade turning vanes themselves is inherently limited by their slatted configuration and multitude of cells, yet is typically acceptable due to the limited use of the thrust reverser for landing operation only.

Accordingly, it is desired to provide an improved thrust reverser having increased efficiency, and decreased weight and complexity for improving overall operation of the turbofan engine.

BRIEF SUMMARY OF THE INVENTION

A thrust reverser includes axially adjoining forward and aft cowls defining a fan nacelle for surrounding a fan and core engine with a fan duct therebetween. The aft cowl has a forward face and the forward cowl has an aft face adjoining each other to define a reverser nozzle which converges radially outwardly. The aft cowl is translatable between a stowed position in which the reverser nozzle is closed and a deployed position in which the reverser nozzle is open for discharging fan air in a forward direction for thrust reversal.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
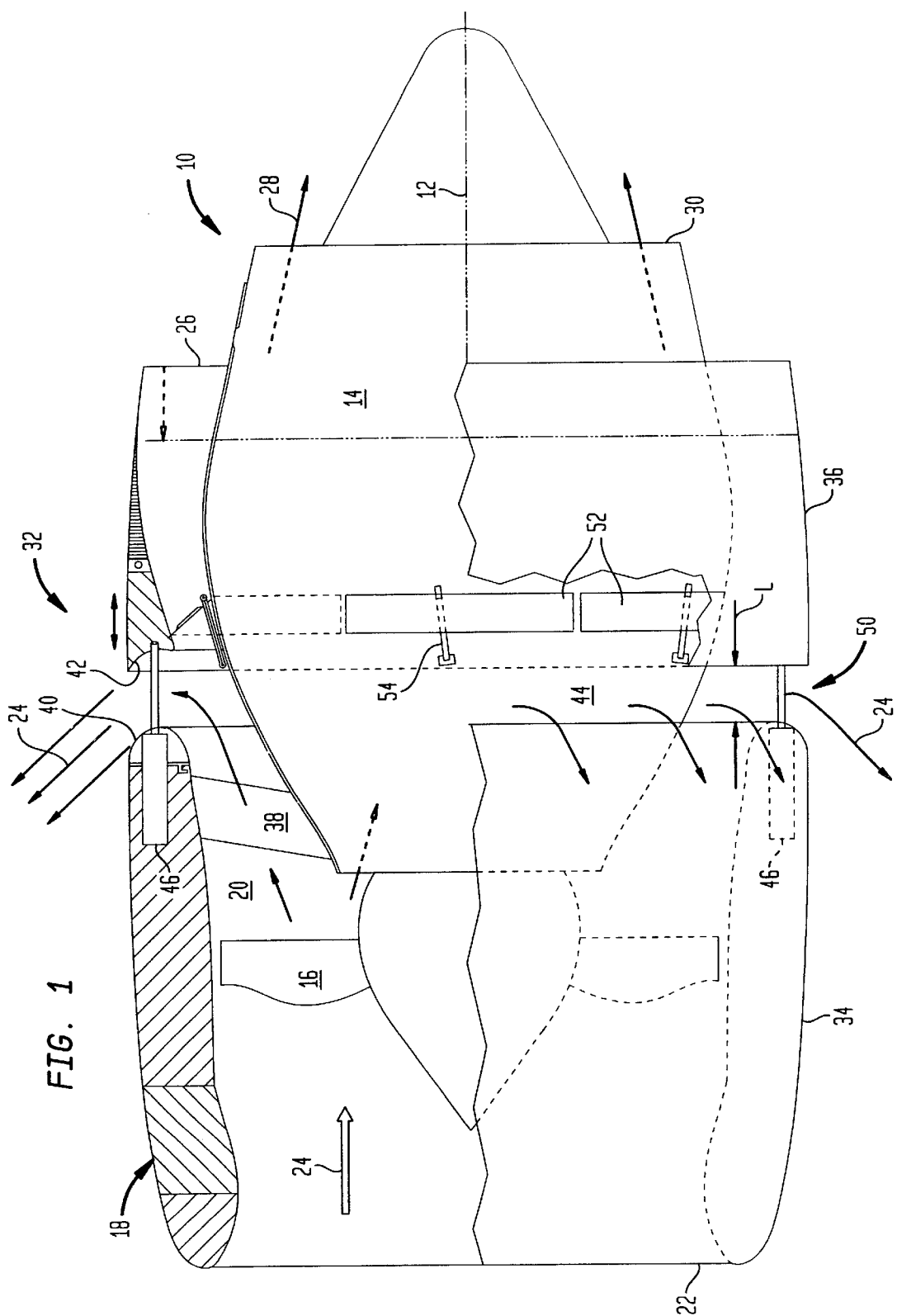
FIG. 1 is a partly sectional, axial elevational view of an exemplary turbofan gas turbine engine including a fan thrust reverser in accordance with an exemplary embodiment of the present invention.

Illustrated schematically in FIG. 1 is a turbofan gas turbine engine 10 configured for powering an aircraft (not shown) in flight. The engine is generally axisymmetrical about a longitudinal or axial centerline axis 12.

The engine includes a core turbine engine 14 joined to a fan 16 at an upstream end thereof. The core engine and fan are mounted concentrically inside an annular fan nacelle 18 between which defines a substantially annular fan duct 20.

The nacelle includes an inlet 22 through which ambient air 24 is received during operation. The fan is powered by the core engine and pressurizes the air, the outer portion of which fan air is discharged through the fan duct axially aft in the downstream direction for discharge through a converging fan exhaust nozzle 26.

An inner portion of the fan air is channeled inside the core engine wherein it is further compressed by a multistage axial compressor and then mixed with fuel in a combustor and ignited for generating hot combustion gases 28 which are discharged from an outlet nozzle 30 of the core engine typically aft of the fan nozzle 26.

The turbofan engine as above described is conventional in configuration and operation for producing thrust by the fan air 24 discharged from the fan nozzle 26 and the combustion gases 28 discharged from the core nozzle 30 during normal flight operation. During landing of the aircraft, it is desired to provide reverse thrust using the fan air 24 to assist in braking the aircraft as it travels along the runway.

In accordance with the present invention, the turbofan engine 10 illustrated in FIG. 1 is modified to include a fan thrust reverser 32 for selectively reversing the fan air 24 from the normal axially aft or downstream direction to an axially forward or upstream direction through a portion of the fan nacelle 18. The fan nacelle includes an upstream portion in the form of an annular forward cowl 34 and a downstream portion in the form of an annular aft cowl 36. The forward cowl is fixedly joined to the forward end of the core engine by a plurality of circumferentially spaced apart radial struts 38 and surrounds the row of rotor blades of the fan.

Figure 2:
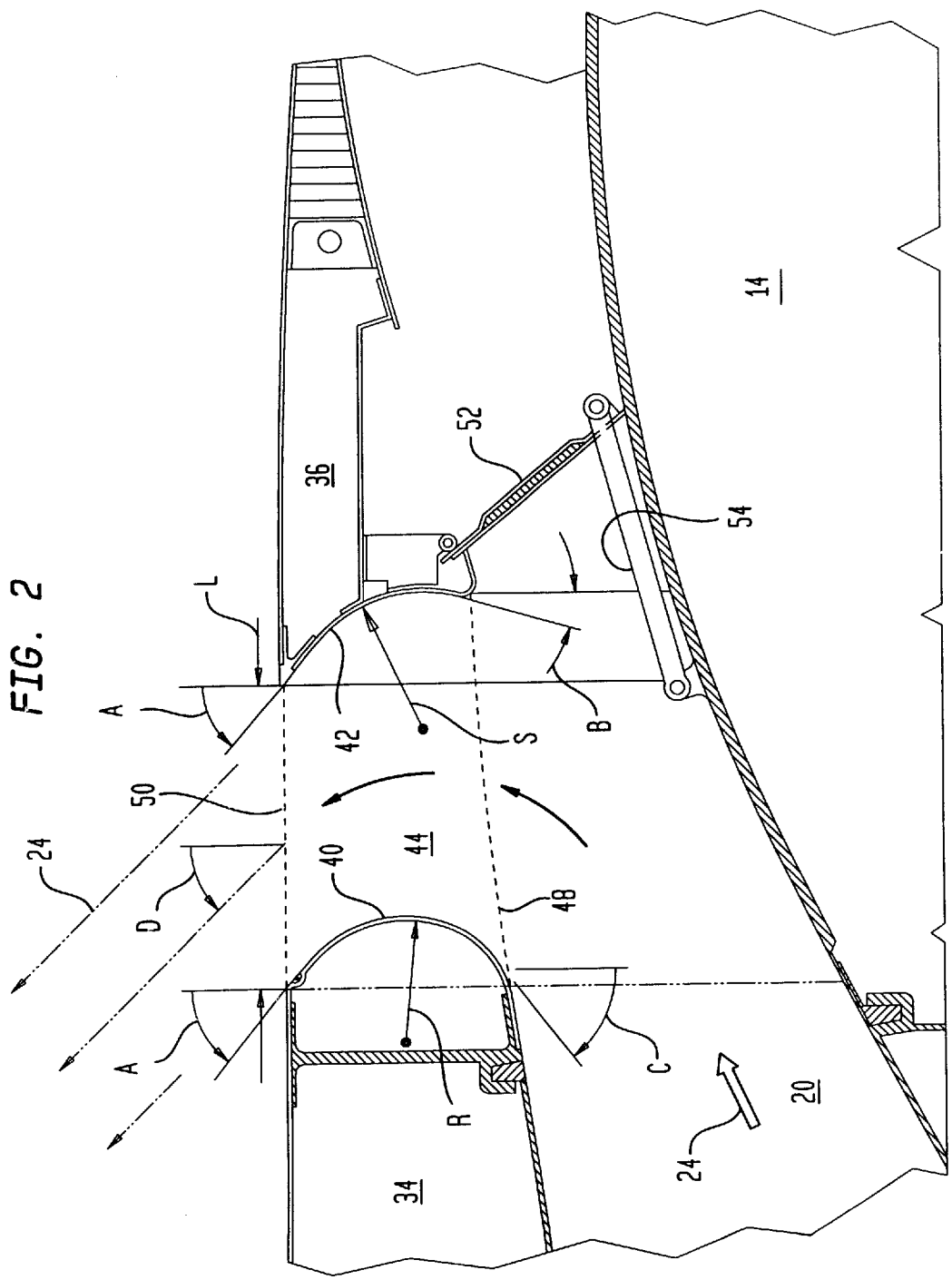
FIG. 2 is an enlarged axial sectional view of a portion of the thrust reverser illustrated in FIG. 1 shown in a deployed position with an aft cowl extended axially aft from a stationary forward cowl for opening the reverser nozzle.

As shown in more detail in FIG. 2, the forward cowl 34 of the fan nacelle has an aft wall or face 40 which faces in the axially aft or downstream direction. Correspondingly, the aft cowl 36 of the fan nacelle has a forward wall or face 42 which faces axially forward in the upstream direction in opposition to the aft face 40. The aft or upstream face 40 axially adjoins the forward or downstream face 42 and is coaxially aligned therewith to define a reverser discharge nozzle or outlet 44 therebetween.

As shown in FIG. 1, means in the exemplary form of a plurality of linear actuators 46 are mounted inside the forward cowl for axially translating the aft cowl in axial throw relative to the stationary forward cowl to open and close the reverser nozzle when desired. The actuating means may have any conventional form such as electric or hydraulic actuators having output rods joined to the aft cowl for translating the aft cowl in axial unison aft and forward as required.

In the exemplary embodiment illustrated, there are four actuators 46 in total mounted in two pairs on opposite sides of the engine with suitable circumferential separation therebetween. The actuators support the aft cowl which is retracted to a stowed position abutting the forward cowl to close the reverser nozzle, or alternatively the actuators extend the aft cowl aft to a deployed position to fully open the reverser nozzle for thrust reverse operation.

A significant feature of the present invention is the axial profile of the reverser nozzle 44 illustrated in FIG. 2 which converges radially outwardly with preferred contour for maximizing turning efficiency of the fan air during thrust reverse operation in a minimum of space. In the open configuration illustrated in FIG. 2, the reverser nozzle 44 converges in flow area for both turning and accelerating the fan air 24 during thrust reverse operation.

The aft face 40 of the forward cowl is generally axially convex and cooperates with the forward face 42 of the aft cowl which is generally axially concave. The convex and concave faces 40,42 are preferentially different than each other in the axial section illustrated and converge in the radially outer direction.

The radially inner surfaces or edges of the forward and aft faces define axially and circumferentially therebetween an inlet 48 of the reverser nozzle. Correspondingly, the radially outer surfaces or edges of the forward and aft faces define axially and circumferentially therebetween an outlet 50 of the reverser nozzle.

The nozzle outlet 50 extends circumferentially around the perimeter of the fan nacelle axially between the forward and aft cowl portions thereof, and has a larger diameter than that of the nozzle inlet disposed inside the fan nacelle at the outer boundary of the fan duct 20. As shown in FIG. 2 in the fully open position of the reverser nozzle, the inlet 48 is both axially longer than the nozzle outlet 50 and larger in inlet flow area than the flow area of the outlet. In this way, the reverser nozzle 44 converges between its inlet and outlet for accelerating the fan air 24 for increasing the reverse thrust forces therefrom.

The reverser nozzle 44 illustrated in FIG. 2 is configured for both accelerating the fan discharge air as well as turning that air in the upstream direction in an efficient manner. More specifically, the forward and aft faces at the reverser outlet 50 preferably have substantially equal discharge angles A measured in the forward direction relative to a radial or vertical axis for discharging the fan air in a generally upstream direction as opposed to the normal axially downstream direction thereof inside the fan duct. Correspondingly, the forward and aft faces at the reverser inlet 48 have different incidence or inlet angles B,C also measured respectively from radial or vertical axes in the upstream or forward direction therefrom.

In an exemplary embodiment, the discharge angles A are about 50 degrees, the incidence angle B for the forward face 42 is about 12 degrees, and the incidence angle C for the aft face 40 is substantially greater than that for the forward face and is about 55 degrees for example. In this way, the initially downstream directed fan air 24 is first turned at relatively low velocity as it flows through the reverser inlet and is then accelerated in the aft direction and discharged through the reverser outlet 50 with an effective discharge angle D of about 45 degrees. The fan air is thusly efficiently turned at low velocity for minimizing aerodynamic losses therein, and then accelerated for increasing the velocity thereof and maximizing thrust force available for thrust reverse operation.

In the preferred embodiment illustrated in FIG. 2 the aft face 40 is substantially an axially convex circular arc of radius R, and the opposing forward face 42 is a substantially an axially concave circular arc of radius S. Each of the arcuate forward and aft faces has a corresponding origin or center of curvature at the base end of the radii R,S, which are preferably radially spaced apart to effect the converging configuration of the reverser nozzle 44 in axial section.

Figure 3:
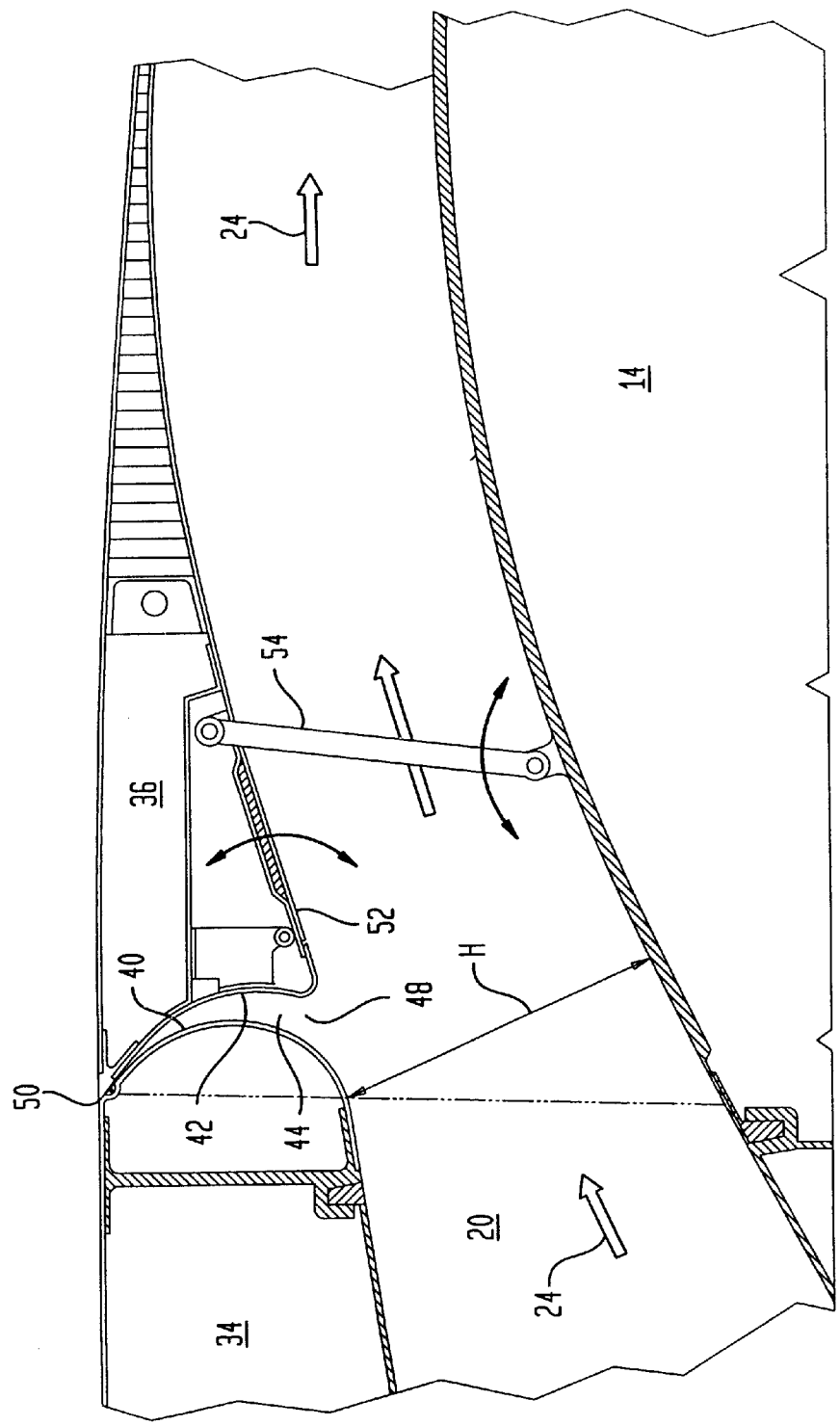
FIG. 3 is an enlarged axial sectional view like FIG. 2 illustrating the aft cowl retracted in a stowed position in abutment with the forward cowl for closing the reverser nozzle.

In the preferred embodiment illustrated, the center of curvature of the forward face 42 is radially inwardly of the center of curvature of the aft face 40 so that the radially outer ends of the forward and aft faces are always axially closer together than the radially inner ends thereof. This is best illustrated in FIG. 3 in which the aft cowl 36 is stowed in axial abutment with the forward cowl 34 with the reverser nozzle 44 being closed. The reverser outlet 50 illustrated therein is effectively closed by abutment between the contacting surfaces of the forward and aft faces, but the reverser inlet 48 nevertheless remains partly open in view of the radially outwardly converging profiles of the forward and aft faces.

As shown in both FIGS. 2 and 3, the aft face 40 has a chord extending substantially radially only without axial tilt between the reverser inlet 48 and outlet 50. Correspondingly, the chord bridging the forward face 42 between the nozzle inlet and outlet is tilted or inclined in the axial upstream direction.

The resulting reverser nozzle 44 provides an efficient transition for reversing the fan air 24 radially outwardly through the nozzle. The fan air firstly undergoes turning at relatively low velocity in generally the first half of the reverser nozzle, followed in turn by acceleration of the fan air in the second half of the reverser nozzle which directs the fan air at the effective discharge angle D in the forward direction for thrust reverse operation. The low velocity turning of the fan air ensures the reduction or elimination of undesirable flow separation along the convex, low-pressure aft face 40 for maximizing performance.

Computer analysis of this configuration indicates efficient turning and acceleration of the fan air for maximizing aerodynamic performance and thrust reverse forces. And, the reverser nozzle 44 has a relatively high discharge coefficient, which is the ratio of the effective flow area thereof over the actual or physical flow area. Conventional cascade turning vanes have substantially low discharge coefficients, whereas the converging reverser nozzle 44 has a relatively high discharge coefficient.

The converging reverser nozzle 44 described above enjoys many benefits. Firstly, this preferred form of the reverser nozzle is cascadeless and permits the complete elimination of conventional cascade vanes for many advantages attributable thereto. By eliminating cascade vanes, the reverser nozzle is substantially unobstructed in flow both axially and circumferentially, except as required for the actuators, aircraft pylon, and supporting beam typically used in clamshell fan thrust reversers which would also be found in the present reverser.

In its deployed position illustrated in FIG. 2, the reverser nozzle is unobstructed. In the stowed position illustrated in FIG. 3, the two faces 40,42 may be closely spaced together without regard for cascade vanes which would otherwise be located in this region.

The elimination of the cascade vanes correspondingly eliminates the associated weight therefor, and the complexity associated therewith. Furthermore, elimination of the cascade vanes permits the axial translation or throw of the aft cowl to be substantially decreased over that required for cascade fan reversers. And, the shorter throw permits a corresponding reduction in nacelle and engine length, weight, and complexity.

More specifically, the fan duct 20 illustrated in FIG. 1 typically converges in downstream direction between its inlet 22 and outlet nozzle 26. The fan duct has a corresponding flow area across the radial span height H at the entrance to the reverser nozzle 44 as illustrated in FIG. 3. When the reverser nozzle is open for thrust reverse as illustrated in FIG. 2, sufficient flow area must be provided therethrough to continue the flow area from the duct across the span height H thereof.

The axial throw L of the aft cowl is relatively short since the full, unobstructed flow area of the reverser nozzle 44 is available for discharging the fan air diverted from the fan duct. Proper fan performance requires sufficient flow area through the fan duct during normal operation, as well as through the reverser nozzle during thrust reverse operation. Insufficient flow area creates undesirable back pressure on the fan, and can cause undesirable flutter or vibration in the fan blades.

Since the full flow area of the cascadeless nozzle is available to meet the flowrate requirements of the fan, the aft cowl throw L may be relatively short compared with the throw of cascade fan reversers. For example, the axial throw L may be generally equal to the radial span H of the fan duct 20 illustrated in FIG. 3 at the reverser inlet 48.

The flow area of the fan duct at the span H is an annulus bounded radially inwardly by the core cowling, and radially outwardly by the inner lining of the nacelle. The flow area of the nozzle outlet 50 is substantially an annular slot having a substantially common diameter along the axial throw L. And, the generally equal throw L and duct span H permits the desired flow convergence through the reverser nozzle, which further minimizes the required axial throw.

Fan reversers with axially translating aft cowls may be used with or without cooperating thrust reversing deflector doors. The use of deflector doors depends in part on the aerodynamic profile of the fan duct itself including the axially convex bulge around the core engine in the vicinity of the thrust reverser.

In the exemplary embodiment illustrated in FIG. 1, the thrust reverser also includes a plurality of deflector or blocking doors 52 pivotally joined at their upstream ends to the inside of the aft cowl. The doors circumferentially adjoin each other for selectively blocking the fan duct 20 during deployment of the aft cowl.

In the exemplary embodiment illustrated, the doors 52 are actuated by a corresponding plurality of drag links 54 pivotally joined at outer ends to respective ones of the doors, and having inner ends suitably pivotally joined to the core engine 14.

As initially shown in FIG. 3, the aft cowl 36 is stowed and the doors 52 are stowed along the inner surface thereof, with the drag links 54 extending radially outwardly through the fan duct between the core engine and the aft cowl.

As shown in FIG. 2, the aft cowl 36 is translated aft by the actuators and the drag links 54 pull inwardly the aft ends of the doors 52 for tilting them inwardly to block the fan duct 20 at the forward end of the aft cowl. Correspondingly, the drag links 54 pivot rearwardly and rest generally parallel atop the cowling surrounding the core engine.

When the aft cowl is closed as illustrated in FIG. 3, the respective doors 52 pivot radially outwardly the drag links 54 which in turn pivots the doors at their forward ends to return them to their stowed and flush position along the inner surface of the aft cowl.

The doors 52 and drag links 54 may have any conventional form and mounting. In the exemplary embodiment illustrated in FIG. 3, there are three circumferentially adjoining doors 52 on each side of the clamshell thrust reverser, with each of the six doors having a corresponding drag link 54. The clamshell configuration of the aft cowl 36 permits convenient maintenance thereof since each clamshell half is typically pivotally mounted at its upper end along the aircraft pylon so that the inner end of the clamshell halves may be disconnected and opened from a supporting beam at the bottom of the engine.

The short throw cascadeless fan thrust reverser described above enjoys many advantages including a substantial reduction in the number of parts, the elimination of cascade vanes, reduction of weight and complexity, and increased thrust reverse performance not previously possible. The elimination of the cascades not only reduces the associated weight therewith, but has a synergistic affect in that the fan nacelle may have reduced length associated with the reduction in deployment throw required for the reverser. The fan thrust reverser therefore has relatively few parts with enhanced aerodynamic efficiency and performance and improves the overall operation of the turbofan engine.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured Letters Patent of the United States is the invention as defined and differentiated in the following claims in which we claim:

1. A thrust reverser for reversing fan air discharged from a fan through a fan duct defined between a core engine and a fan nacelle comprising:

a forward cowl of said nacelle having an aft face;

an aft cowl of said nacelle having a forward face adjoining said aft face to define a reverser nozzle converging radially outwardly; and means for axially translating said aft cowl relative to said forward cowl to open and close said reverser nozzle.

2. A reverser according to claim 1 wherein said aft face is axially convex and said forward face is axially concave with different converging profiles thereof.

3. A reverser according to claim 2 wherein:

radially inner surfaces of said forward and aft faces define therebetween an inlet of said reverser nozzle;

radially outer surfaces of said forward and aft faces define therebetween an outlet of said reverser nozzle; and said inlet is axially larger than said outlet.

4. A reverser according to claim 3 wherein said forward and aft faces at said reverser outlet have substantially equal discharge angles, and said forward and aft faces at said reverser inlet have different incidence angles.

5. A reverser according to claim 4 wherein said aft face is a substantially axially circular arc, and said forward face is a substantially axially circular arc, with radially spaced apart centers of curvature.

6. A reverser according to claim 5 wherein said center of curvature of said forward face is radially inwardly of said center of curvature of said aft face.

7. A reverser according to claim 6 wherein said aft face has a chord extending substantially radially between said reverser inlet and outlet.

8. A reverser according to claim 4 wherein said reverser nozzle is cascadeless.

9. A reverser according to claim 4 wherein said reverser nozzle is substantially unobstructed when said aft cowl is extended aft into a deployed position.

10. A reverser according to claim 4 wherein:

said translating means are configured for extending said aft cowl in axial throw aft to a deployed position opening said reverser nozzle, and retracting said aft cowl forward to a stowed position in abutment with said forward cowl for closing said reverser nozzle; and said aft cowl throw is generally equal to the radial span of said fan duct at said reverser inlet.

11. A reverser according to claim 4 further comprising a plurality of deflector doors pivotally joined inside said aft cowl and circumferentially adjoining each other for selectively blocking said fan duct during deployment of said aft cowl.

12. A reverser according to claim 11 further comprising a plurality of drag links pivotally joined at outer ends to respective ones of said doors, and having inner ends for being pivotally joined to said core engine for deploying said doors as said aft cowl is deployed aft.

13. A turbofan engine thrust reverser comprising:

a core turbine engine joined to a fan;

an annular forward cowl fixedly joined to said core engine and surrounding said fan;

an aft cowl surrounding said core engine and cooperating with said forward cowl to define a fan duct for channeling fan air around said core engine;

said forward cowl having an aft face adjoining a forward face of said aft cowl to define a reverser nozzle converging in flow area radially outwardly from said fan duct;

a plurality of actuators mounted inside said forward cowl for axially translating said aft cowl in axial throw from a stowed position abutting said forward cowl to close said reverser nozzle, to a deployed position extending aft said aft nozzle to open said reverser nozzle; and a plurality of circumferentially adjoining deflector doors pivotally joined between said aft cowl and said core engine for blocking said fan duct aft of said reverser nozzle when said aft cowl is deployed, and unblocking said fan duct when said aft nozzle is stowed.

14. A reverser according to claim 13 wherein:

radially inner surfaces of said forward and aft faces define therebetween an inlet of said reverser nozzle;

radially outer surfaces of said forward and aft faces define therebetween an outlet of said reverser nozzle; and said inlet is axially larger than said outlet.

15. A reverser according to claim 14 wherein said forward and aft faces at said reverser outlet have substantially equal discharge angles, and said forward and aft faces at said reverser inlet have different incidence angles.

16. A reverser according to claim 15 wherein said aft face is axially convex and said forward face is axially concave with different converging profiles thereof.

17. A reverser according to claim 16 wherein said aft face is a substantially axially circular arc, and said forward face is a substantially axially circular arc, with radially spaced apart centers of curvature.

18. A reverser according to claim 17 wherein said center of curvature of said forward face is radially inwardly of said center of curvature of said aft face.

19. A reverser according to claim 18 wherein said reverser nozzle is cascadeless, and said aft cowl throw is generally equal to the radial span of said fan duct at said reverser inlet.

20. A reverser according to claim 19 further comprising a plurality of drag links pivotally joined at outer ends to respective ones of said doors, and having inner ends for being pivotally joined to said core engine for deploying said doors as said aft cowl is deployed aft.

* * * * *